(12) United States Patent
Kasap et al.

(10) Patent No.: US 12,461,956 B2
(45) Date of Patent: Nov. 4, 2025

(54) TELECOMMUNICATIONS NETWORK MANAGEMENT

(71) Applicant: MICROSOFT TECHNOLOGY LICENSING, LLC, Redmond, WA (US)

(72) Inventors: Mustafa Kasap, Kenmore, WA (US); Alejandro Jose Miguel, Sammamish, WA (US); Jason Hogg, Kirkland, WA (US); Anthony Justin Howe, Seattle, WA (US); William Lee Labor, Jr., Dagsboro, DE (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/542,527

(22) Filed: Dec. 15, 2023

(65) Prior Publication Data

US 2025/0200087 A1 Jun. 19, 2025

(51) Int. Cl.
| | |
|---|---|
| *G06F 17/30* | (2006.01) |
| *G06F 16/334* | (2025.01) |
| *G06F 21/62* | (2013.01) |
| *G06F 16/28* | (2019.01) |
| *G06F 40/40* | (2020.01) |

(52) U.S. Cl.
CPC ...... *G06F 16/3344* (2019.01); *G06F 21/6245* (2013.01); *G06F 16/284* (2019.01); *G06F 40/40* (2020.01)

(58) Field of Classification Search
CPC .............. G06F 16/3344; G06F 16/284; G06F 21/6245; G06F 40/20; G06F 40/30; G06F 40/40
See application file for complete search history.

(56) References Cited

U.S. PATENT DOCUMENTS

| | | | |
|---|---|---|---|
| 9,996,618 B2 * | 6/2018 | Stevenson | G06F 16/951 |
| 11,354,322 B2 * | 6/2022 | Murphey | G06F 16/2477 |
| 11,693,855 B2 * | 7/2023 | Khorasani | G06F 16/24522 707/739 |
| 11,765,207 B1 * | 9/2023 | McCarthy | G06F 40/186 |
| 2016/0277374 A1 * | 9/2016 | Reid | H04L 63/0435 |
| 2020/0057864 A1 * | 2/2020 | Parthasarathy | G06F 16/24578 |
| 2020/0242269 A1 * | 7/2020 | Narayanaswamy | G06F 21/55 |
| 2021/0021614 A1 * | 1/2021 | Shahbaz | H04L 63/1475 |
| 2021/0157985 A1 * | 5/2021 | Rotkop | G06F 40/205 |

* cited by examiner

*Primary Examiner* — Greta L Robinson
(74) *Attorney, Agent, or Firm* — Newport IP LLC; Han Gim

(57) ABSTRACT

A natural language query is received from an operator of a telecommunications network. A metadata request is computed from the natural language query. The metadata request is sent to a repository of metadata, the metadata describing telemetry data of the telecommunications network, the telemetry data stored in a relational database. Metadata is received from the metadata repository in response to the metadata request. Using the received metadata and a language model a relational database query is computed and the relational database is queried. A response is received from the relational database, triggering an action.

20 Claims, 8 Drawing Sheets

TELECOMMUNICATIONS NETWORK MANAGEMENT

BACKGROUND

Telecommunications network operators (telco operators), such as 5G private network mobile operators, deal not only with massive amounts of telemetry data but also with complex structures and relationships between stored tables of the telemetry data. Telco operators seek to understand and interpret these massive amounts of telemetry data in real time so that telecommunications infrastructure can be appropriately managed.

The embodiments described below are not limited to implementations which solve any or all of the disadvantages of known telecommunications network management systems.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A telco operator, managing a communications network such as a private 5G mobile network, is able to use a natural language interface to find insights from telemetry data and achieve improved management of the mobile network.

In various examples, a natural language query is received from an operator of a telecommunications network. A metadata request is computed from the natural language query. The metadata request is sent to a repository of metadata, the metadata describing telemetry data of the telecommunications network, the telemetry data stored in a relational database. Metadata is received from the metadata repository in response to the metadata request. Using the received metadata and a language model a relational database query is computed and the relational database is queried. A response is received from the relational database, triggering an action.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
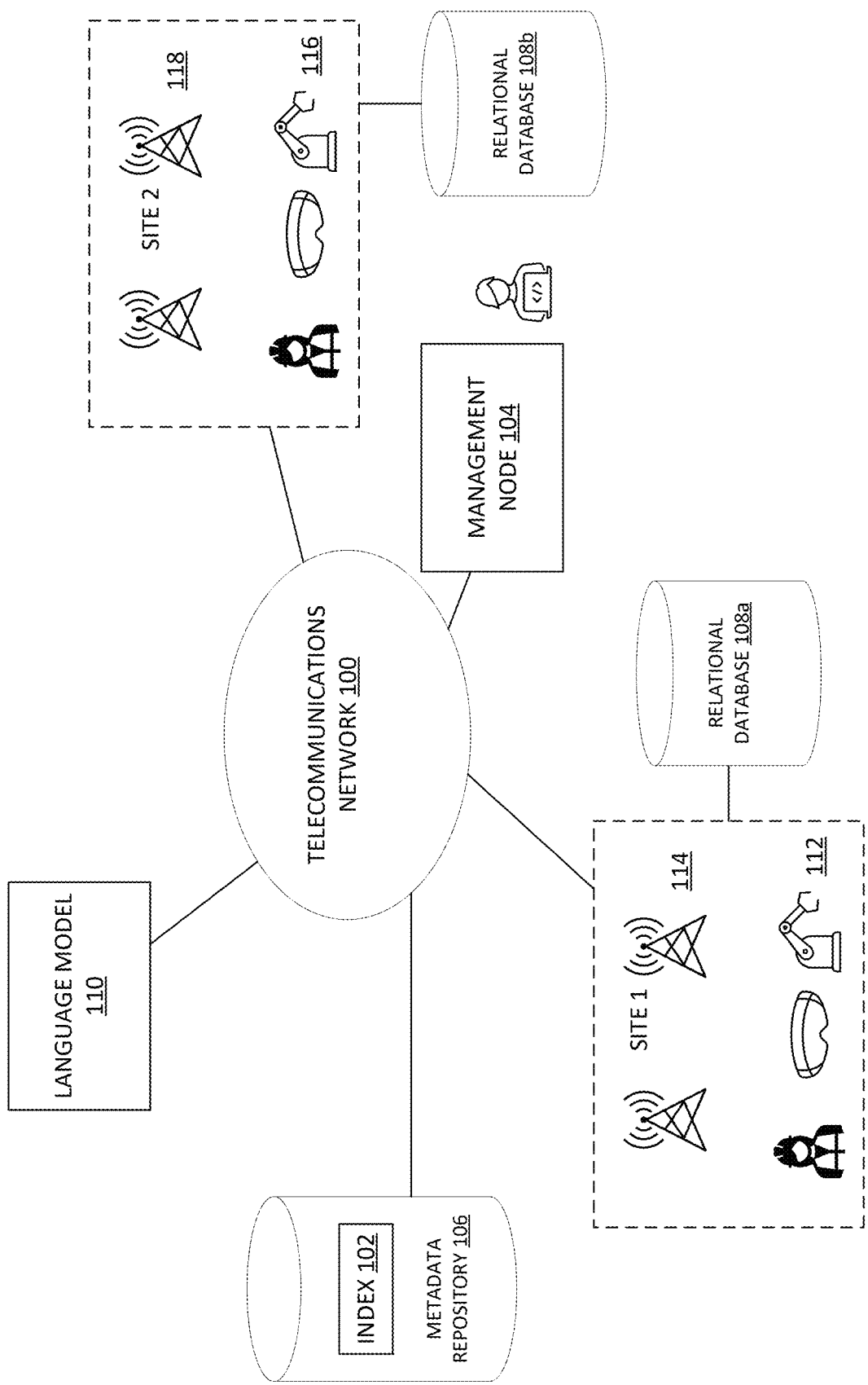
FIG. 1 is a schematic diagram of a telecommunications network having a management node for managing a private 5G mobile network.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

5G mobile operators deal with not only massive amounts of telemetry data but also with complex structures and relationships of telemetry data records. The 5G mobile operator needs to be fully onboarded to i.e., a single data record table which might have around hundreds of columns of relational data to be able to extract proper analytics out of a table and even make cross relations with other tables or data sources. The term "telemetry data" is used to refer to measurements from equipment such as cellular base stations, radio access network nodes, routers, switches, session border controllers, firewalls and other communications network nodes. A non-exhaustive list of examples of types of telemetry data is: jitter, packet loss, round trip time, available bandwidth, packet rate, traffic level. Another example of telemetry data is data about flows of traffic (such as a flow route and flow quantity) within a telecommunications network at a given point in time.

In addition, 5G mobile operators need to ensure security of telemetry data since many types of telemetry data may be derived from or associated with personally identifiable information such as telephone numbers. Some types of telemetry data, such as traffic flow data, if obtained by a malicious party could be used to breach security.

Telco operators face increasing complexity as their networks often span over disparate geographical sites. Consider a telco operator with a private 5G mobile network at a factory site on land and linking to a site at an oil rig in the sea. The telco operator has to manage telemetry data from the disparate sites, keep the data secure, ensure the data is geographically located so as to comply with regulations, and yet also use the data in real time to manage the private 5G network.

The inventors have recognized that using a dedicated repository of metadata, describing the telemetry data, brings significant benefits in terms of security and ability to effectively manage telemetry data. The metadata may have a data map, indicating geographical locations and/or internet protocol addresses of telemetry data records. The metadata may comprise identifiers or names of tables of telemetry data, schemas of relational databases of the telemetry data, column names of tables of telemetry data, flags indicating columns that contain personally identifiable information.

A telco operator, managing a communications network such as a private 5G mobile network, is able to use a natural language interface to find insights from telemetry data and achieve improved management of the mobile network. A language model is used together with the metadata repository to enable the telco operator to use the telemetry data to manage the communications network in real time. The telco operator is provided with an interactive user interface for managing the communications network, or obtaining insights from the telemetry data, using natural language.

FIG. 1 is a schematic diagram of a telecommunications network 100 having a management node 104 for managing a private 5G mobile network. The private 5G mobile network spans over two sites, site 1 and site 2, in this example. The sites may be geographically remote from one another. Each site has cellular base stations 114, 118 enabling end user equipment 112, 116 to access the 5G mobile network. Each site may have mobile edge computing equipment. The private 5G mobile network uses functionality in a core of the telecommunications network 100 to enable traffic flows between site 1 and site 2. Thus the private 5G mobile network includes a variety of communications network nodes such as mobile base stations, mobile edge computing nodes, session border controllers, firewalls, switches, routers or other nodes.

The telecommunications network comprises, or is connected to a language model 110, a relational database 108a, 108b, a metadata repository 106, an index 102. The relational database may be divided into more than one part, one part at each geographical site of the private 5G mobile network as illustrated (but this is not essential). The index 102 may be part of the metadata repository 106 or may be separate from the metadata repository 106.

The language model is a generative language model which is a neural network with a transformer architecture. A non-exhaustive list of example language models which may be used is: GPT-4, BLOOM, Llama, GEMINI, BERT. An example language model architecture is described later in this document but is not intended to be limiting.

The management node 104 is computer implemented and is shown connected to the telecommunications network 100. In some cases the management node 104 is at site 1 or at site 2. The management node 104 has a user interface to facilitate managing the private 5G mobile network. The user interface may be a graphical user interface or an interface using audio signals without a graphical display. The management node 104 is able to translate or map natural language received from a telco operator engineer into relational database query language for querying the relational database 108a, 108b. The translation or mapping is achieved using a combination of the language model 110 and the metadata repository 106. Responses received from the relational database 108a, 108b are used to trigger actions such as alerts, generation of configuration files for sending to an orchestrator of the telecommunications network, generation of instructions for automated control of the communications network such as by isolating a node, replicating a node, upgrading a node or other automated action.

A natural language query is received from an operator of a telecommunications network. Because the query is in natural language it is straightforward for an engineer operator to enter the query. The query is translated into a relational database query as now explained. A metadata request is computed from the natural language query. The metadata request is sent to a repository of metadata, the metadata describing telemetry data of the telecommunications network, the telemetry data stored in a relational database. Metadata is received from the metadata repository in response to the metadata request. Using the received metadata and a language model a relational database query is computed and the relational database is queried. A response is received from the relational database, triggering an action. The action may be to generate an alert, send a message, or send an instruction to automatically trigger a change in the telecommunications network. Thus there is an efficient, straightforward way for an engineer to manage a telecommunications network. The engineer does not need to understand the query language of the relational database. Also, by using the language model, it is possible to compute a relational database query from the received metadata is an effective way. Because the metadata repository is used, the engineer is able to gain insights from all available telemetry data in a single query without having to query the different parts of the relational database 108a, 108b separately. As the 5G private network scales and gains more sites and complexity the use of the metadata repository brings even more efficiency. Because the metadata repository is used there is increased security since this component may be geographically located in a secure location.

The management node of the disclosure operates in an unconventional manner to achieve natural language management of a telecommunications network.

The management node improves the functioning of the underlying telecommunications network 100 by enabling natural language interaction with an engineer to facilitate actions such as adding nodes, isolating nodes, upgrading nodes, maintaining nodes and more.

Alternatively, or in addition, the functionality of the management node 104 is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

As explained above the management node 104 is a server or other machine that provides a user interface for an engineer managing a 5G mobile communications network. Via the user interface the engineer is able to manage the private communications network by sending configuration files to an orchestrator of the private communications network. The orchestrator is in a control plane of the communications network as explained with reference to FIG. 2 and may be a Kubernetes (trade mark) orchestrator, Docker Swarm (trade mark), Redhat OpenShift (trade mark) or other type of orchestrator. Via the user interface the engineer is able to query the telemetry data using natural language, thus obtaining insights, and is able to take actions as a result, such as by selecting candidate configuration files generated by the language model, for sending to the orchestrator.

Figure 2:
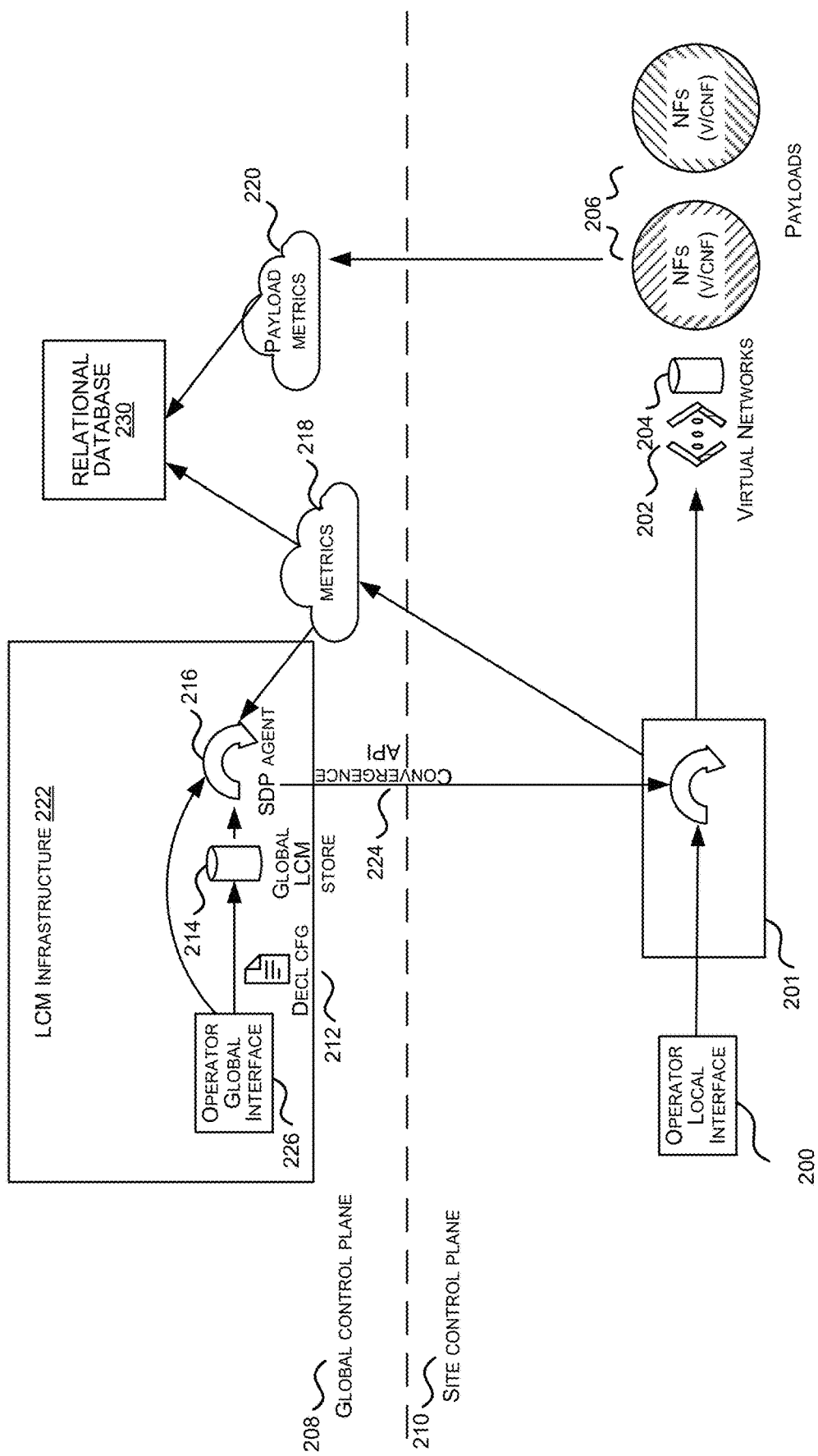
FIG. 2 is a schematic diagram of a global control plane and a site control plane of a telecommunications network such as that of FIG. 1.

FIG. 2 is a schematic diagram of a global control plane and a site control plane of a telecommunications network such as that of FIG. 1. FIG. 2 is a schematic diagram of a site control plane 210 of the private mobile communications network of FIG. 1 as well as of a global control plane 208. The global control plane is global in that it controls a plurality of site control planes 210 although only one site control plane 210 is shown in FIG. 2 for clarity. Both the global control plane 208 and the site control plane 210 are implemented using software that is distributed over physical communications network nodes that make up infrastructure of the communications network.

The global control plane 208 has a software agent 216 that controls when and how configuration files and/or instructions are sent to a management node 201 in the site control plane 210. In some but not all examples the software agent 216 is a safe deployment practices SDP agent. The management node comprises an orchestrator indicated by the curved arrow in management node 201. A convergence application programming interface 224 enables the software agent 216 in the global control plane 208 and the orchestrator in the site control plane to communicate.

An operator local interface 200 exists which is a graphical user interface or other user interface enabling an engineer to control the site control plane via the management node 201. Using the operator local interface 200 an engineer is able to view a dashboard of telemetry data measured from the communications network controlled by the site control plane, and to use natural language to query a relational database of the telemetry data. The communications network comprises a plurality of network functions 206 which are containerized applications that implement a communications network. In some cases the network functions 206 are virtual network functions. Using the network functions 206 one or more virtual networks 202 are formed to enable communications at a private communications network controlled by the site control plane 210.

Telemetry data is measured from the communications network controlled by the site control plane 210. The telemetry data comprises payload metrics 220 measured by the network functions 206 as well as metrics 218 obtained by the management node 201 by probing the network, by reading logs 204 in the network, by observing round trip times, by measuring bandwidth levels, and in other ways.

The telemetry data is sent to a relational database 230 (which is one or more of the parts of the relational database 108a, 108b of FIG. 1). Metadata describing the telemetry data in the relational database 230 is stored in the metadata repository 106 of FIG. 1. A synchronization process takes place at intervals to enable metadata in the metadata repository 106 to be updated to reflect updates to the telemetry data.

Using the management node, an engineer is able to make changes to a configuration file, or create a new configuration file, which when executed by the orchestrator in the management node, deploys changes in the virtual networks 202 and/or network functions 206. The engineer is able to instantiate more network functions in order to scale up services by giving an appropriate configuration file to the orchestrator. In the same way the engineer is able to delete or edit a network function or change topology of a virtual network.

In some examples, the engineer also has an operator global interface 226 enabling them to manage multiple of their sites, each site having a site control plane 210. The operator global interface is part of a life cycle management infrastructure 222 of the global control plane. The life cycle management infrastructure 222 comprises a software agent 216 that receives telemetry data from the site control planes. Note that although only one site control plane is shown in FIG. 2 there are a plurality of site control planes each sending telemetry data comprising metrics 218 and payload metrics 220 to the relational database 230.

The operator global interface enables the engineer to control the site control plane(s) by sending instructions to the software agent 216 which then instructs an orchestrator in each site control plane. The operator global interface 226 may generate a declarative configuration (Decl cfg) file which is sent to the software agent 216 via a global life cycle management store 214. The global life cycle management store may check the declarative configuration file 212 complies with rules or criteria for safe deployment practices. If the check is successful the declarative configuration file is forwarded to the software agent 216 and used to instruct one or more orchestrators in the site control planes.

Figure 3:
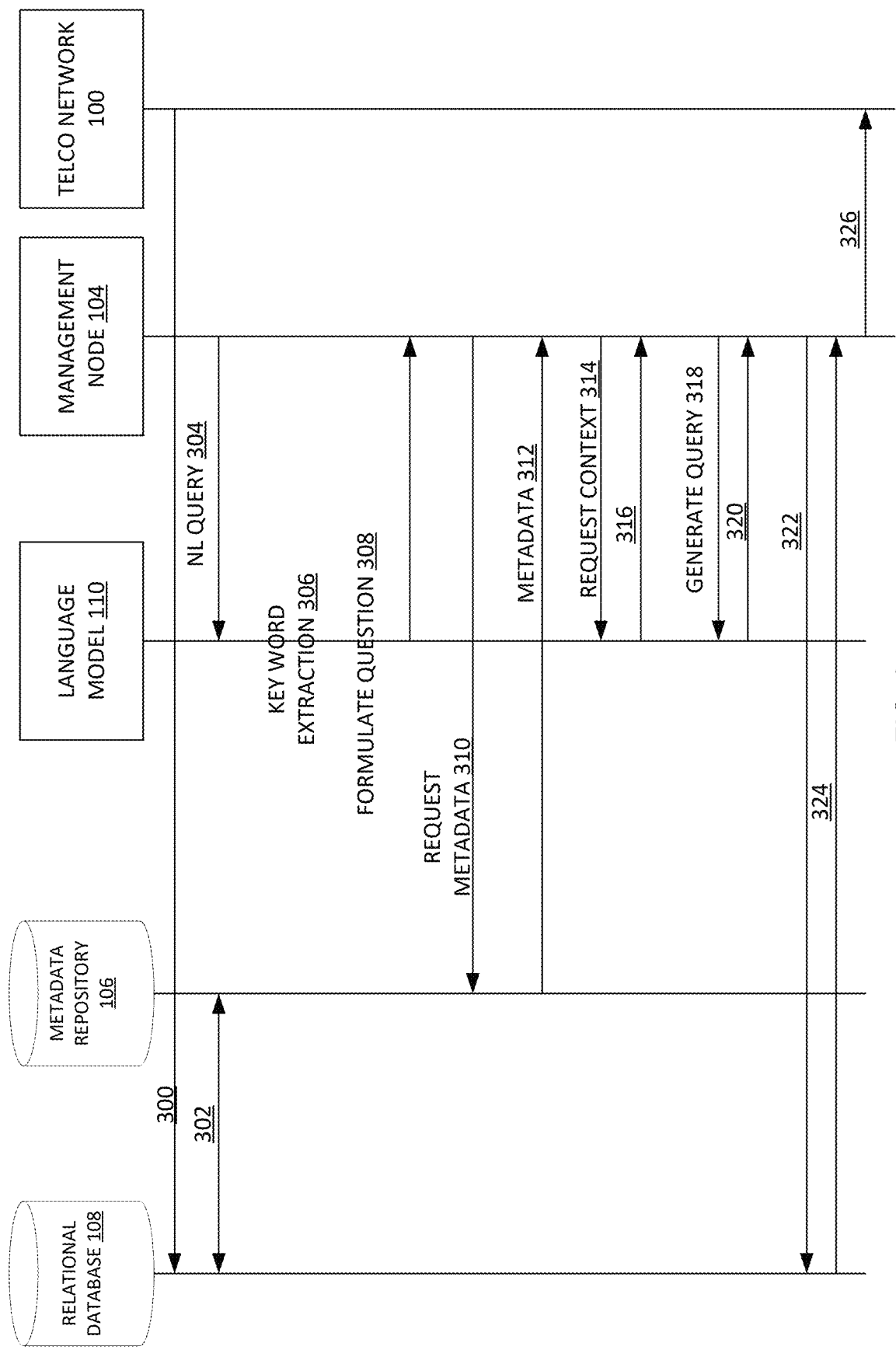
FIG. 3 is a message sequence chart of a method for managing a telecommunications network such as that of FIG. 1.

FIG. 3 is a message sequence chart of a method for managing a telecommunications network such as that of FIG. 1. Telemetry data of a private 5G mobile telecommunications network is measured in the telecommunications network 100 such as from equipment in site 1, site 2 or a core of the telecommunications network. The telemetry data is sent 300 to a relational database 108 which may be distributed over more than one geographical location. Synchronization 302 happens between the relational database 108 and a metadata repository 106 so that the metadata in the metadata repository 106 describes the telemetry data in the relational database 108 and how it is stored. In some examples the metadata repository has an index or an index 102 is computed from the metadata repository. The index has a name or identifier of each table of data in the relational database, information about relationships between the tables, descriptions of column headings of columns of the tables and other metadata.

An engineer using management node 104 enters a natural language query about the 5G private mobile network at a user interface of the management node. In a non-limiting example the natural language query is "At which hours of the day is network bandwidth utilization over 80% by users in the Redmond region?". The natural language query 304 is sent to the language model 110 by the management node 104.

The language model 110 extracts 306 keywords from the natural language query and formulates a question 308 from the keywords. The language model 110 is able to extract the keywords and to formulate the question 308 because it is asked to do so when it is sent the natural language query as part of request or query 304. In an example where the natural language query is "At which hours of the day is network bandwidth utilization over 80% by users in the Redmond region?", the extracted keywords are "bandwidth, timestamp, users, utilization, region/location". In the same example the formulated question is "What are the names of tables and columns in the relational database which contain user bandwidth information?". In this example, the language model was prompted at operation (query) 304 with a prompt such as "extract keywords from the following natural language query and include them in a question to ask a metadata repository".

The language model returns a formulated question 308 to the management node 104. The management node sends the formulated question to the metadata repository 106 in order to request metadata. Thus metadata request message 310 is sent from the management node 104 to the metadata repository.

The metadata request is used to search the metadata repository 106 or an index 102 of the metadata repository. Results of the search comprise metadata which is returned 312 to the management node 104. In an example where the metadata request is "What are the names of tables and columns in the relational database which contain user bandwidth information?" the returned metadata is "TableA(ColumnX, DataTypeX, ColumnY, DataTypeY, . . . TableB( . . . ) . . . TableADescription, ColumnXDescription". In this example the metadata comprises a list of tables which contain user bandwidth information, what columns in those tables contain user bandwidth information, the types of data in the identified columns, a description of each identified table and a description of each identified column.

The management node 104 sends a context request 314 to the language model 110. The context request is a prompt specifying a query language to be used and requesting syntax be added to the metadata. In an example the context request is "add KQL syntax to the following metadata: TableA(ColumnX, DataTypeX, ColumnY, DataTypeY, . . . TableB( . . . ) . . . TableADescription, ColumnXDescription". In this example the query language is KQL. However, this is not intended to be limiting as any query language such as SQL or other query language for querying a relational database may be used.

The language model responds by sending message 316 to the management node. The message 316 comprises syntax added to the metadata. In the example being discussed, the message 316 comprises "ColumnX, ColumnY from (inner|outer| . . . )join tableA and tableB".

The management node 104 sends a request 318 to generate a query to the language model 110. The request 318 comprises a name of a query language to be used, as well as the contents of message 316. The language model 110 returns 320 a query such as "TableA|Project ColumnX, ColumnY|Where ColumnX>Scalar 1".

In some examples the query is presented to the engineer at the management node user interface for the engineer to select. A plurality of candidate queries may be generated by repeating the process of FIG. 3 and presented to the engineer for them to select from. However, this is not essential.

The query is then sent by the management node 104 to relational database 108 which returns 324 telemetry data. The telemetry data is presented to the engineer at a user interface. In this way the engineer gains an insight about the private 5G mobile network and is able to decide what action to take.

In some examples the telemetry data is used together with rules or criteria to trigger an instruction 326 to be automatically sent into the telecommunications network 100 to control the telecommunications network. In an example the instruction is a configuration file that is sent to an orchestrator as explained with reference to FIG. 2.

Figure 4:
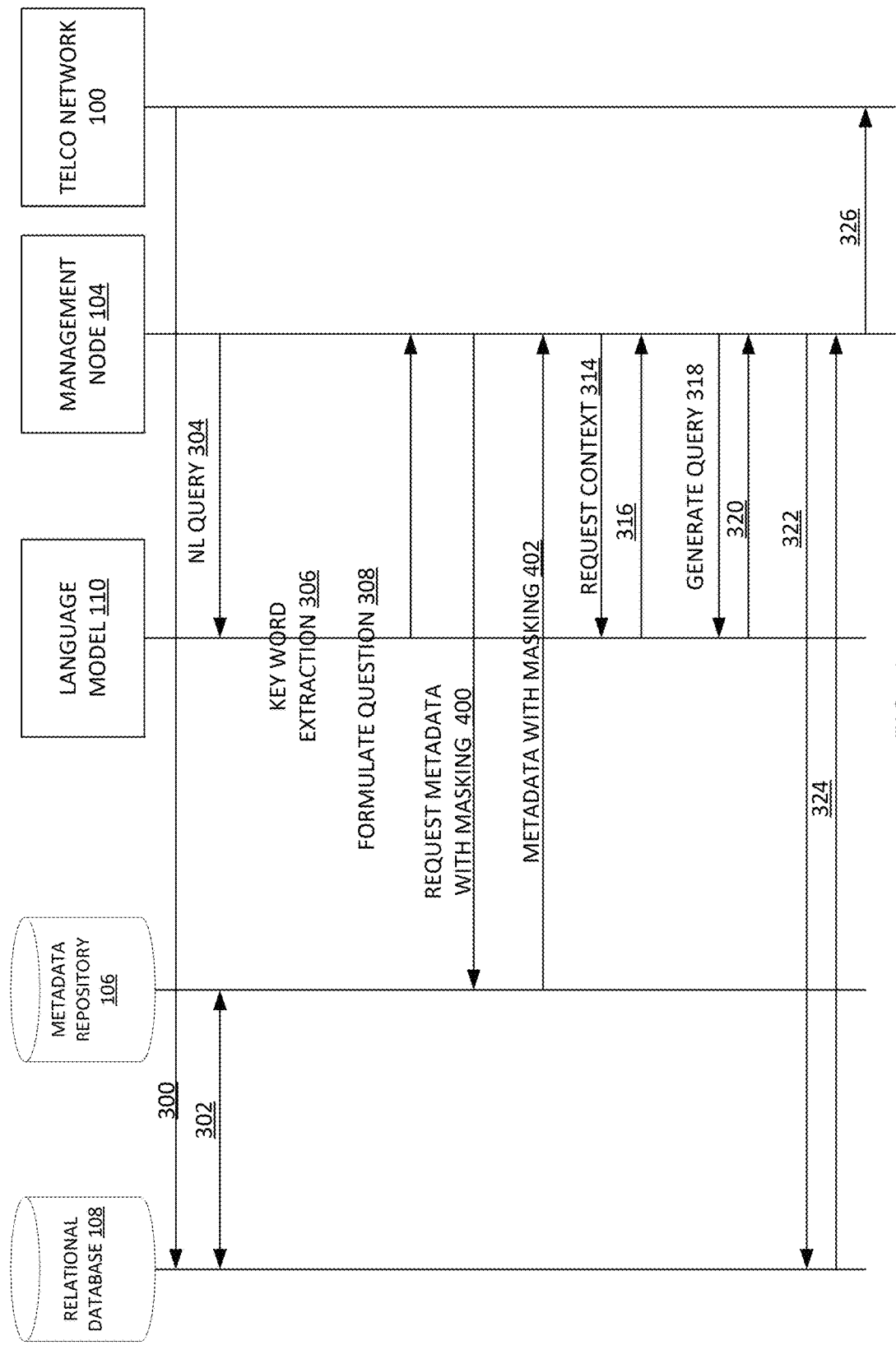
FIG. 4 is a message sequence chart of another method for managing a telecommunications network such as that of FIG. 1 with enhanced security.

FIG. 4 is a message sequence chart of another method for managing a telecommunications network such as that of FIG. 1 with enhanced security. FIG. 4 is the same as FIG. 3 except that when the request is sent from the management node 104 to the metadata repository 106 it includes a request for masking. That is, metadata with masking is requested using request 400. The metadata repository 106 returns metadata with masking in message 402. Masking acts to hide personally identifiable information such as telephone numbers by enabling it to be replaced by a token such as one unique token per telephone number.

When the metadata with masking 402 is returned to the management node, the metadata itself does not comprise personally identifiable information because it is only a description of data. The metadata with masking 402 uses flags or other markers to indicate which columns or tables contain personally identifiable information.

When the request 318 to generate a query is sent to the language model 110 it includes a request for any personally identifiable information to be masked, as well as the marks or flags indicating which tables and/or columns contain personally identifiable information. The generated query is sent 322 and causes the relational database 108 to return data where any personally identifiable information is masked.

The relational database query causes any personally identifiable information to be replaced by tokens such as one unique token per piece of personally identifiable information. When the response is returned 324 from the relational database 108 personally identifiable information is masked. Thus security is enhanced since the management node 104 never has access to and never receives personally identifiable information. Thus by separating the metadata repository from the relational database, and separating both the relational database and metadata repository from the management node, security benefits are obtained. Benefits of scalability are also achieved since as the private mobile network gains more sites the metadata repository is able to keep track of all the telemetry data stored in different locations.

In the examples of FIGS. 3 and 4 the operations 314 and 318 may be combined into a single operation. Operations 316 and 320 may also be combined into a single operation.

Figure 5:
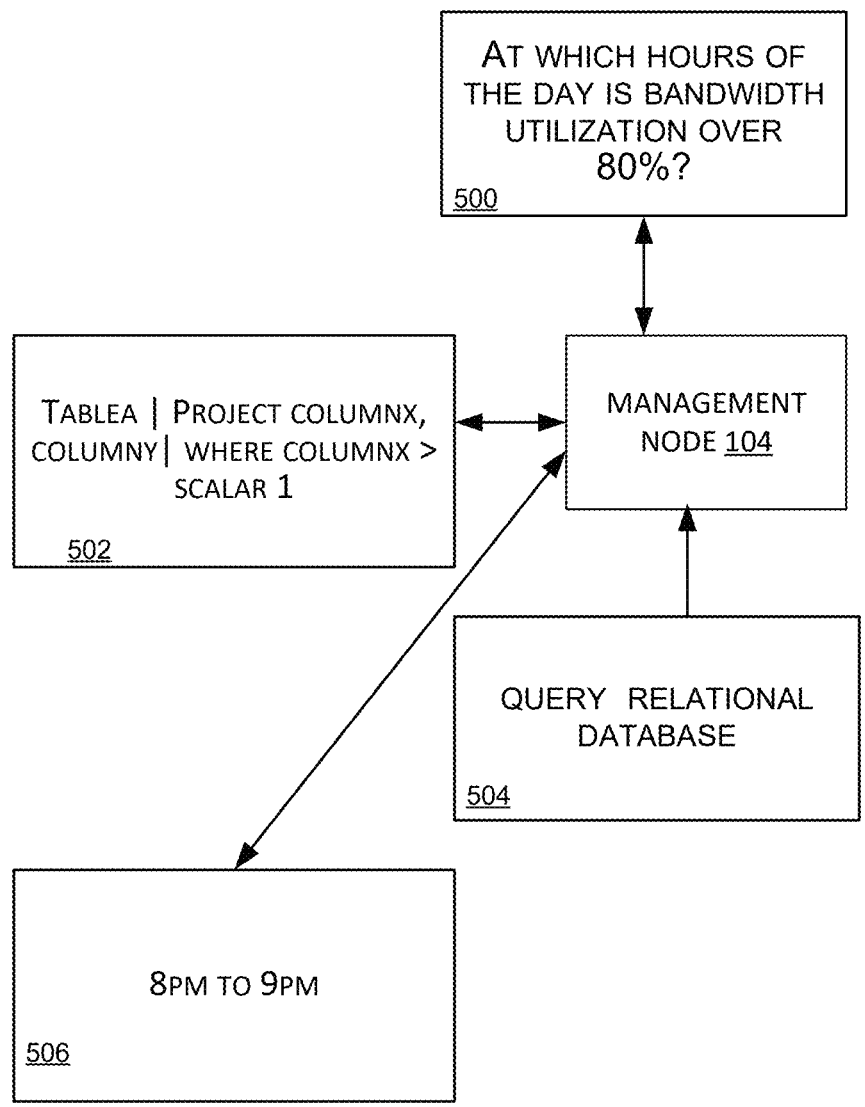
FIG. 5 is a schematic diagram of a user interface operated by a telco operator using a management node such as that of FIG. 1.

FIG. 5 is a schematic diagram of a user interface operated by an engineer of a telco operator using a management node such as that of FIG. 1. The engineer enters a natural language query "at which hours of the day is bandwidth utilization over 80%" 500 such as by speaking the query or typing the query. The management node responds by offering a candidate relational database query 502 to the engineer such as "TableA|Project ColumnX, ColumnY|where ColumnX>scalar1". The engineer may be offered more than one candidate relational database query in some cases. The engineer selects the offered candidate query as indicated by "query relational database" 504 in FIG. 5. The query is sent to the relational database 108 which returns an answer 506 which in this case is 8 pm to 9 pm. The answer (also referred to as an insight) is used to trigger an action, which may be automated, such as dynamically allocating more resources to the Redmond region of the 5G private mobile network from 8 pm to 9 pm.

Figure 6:
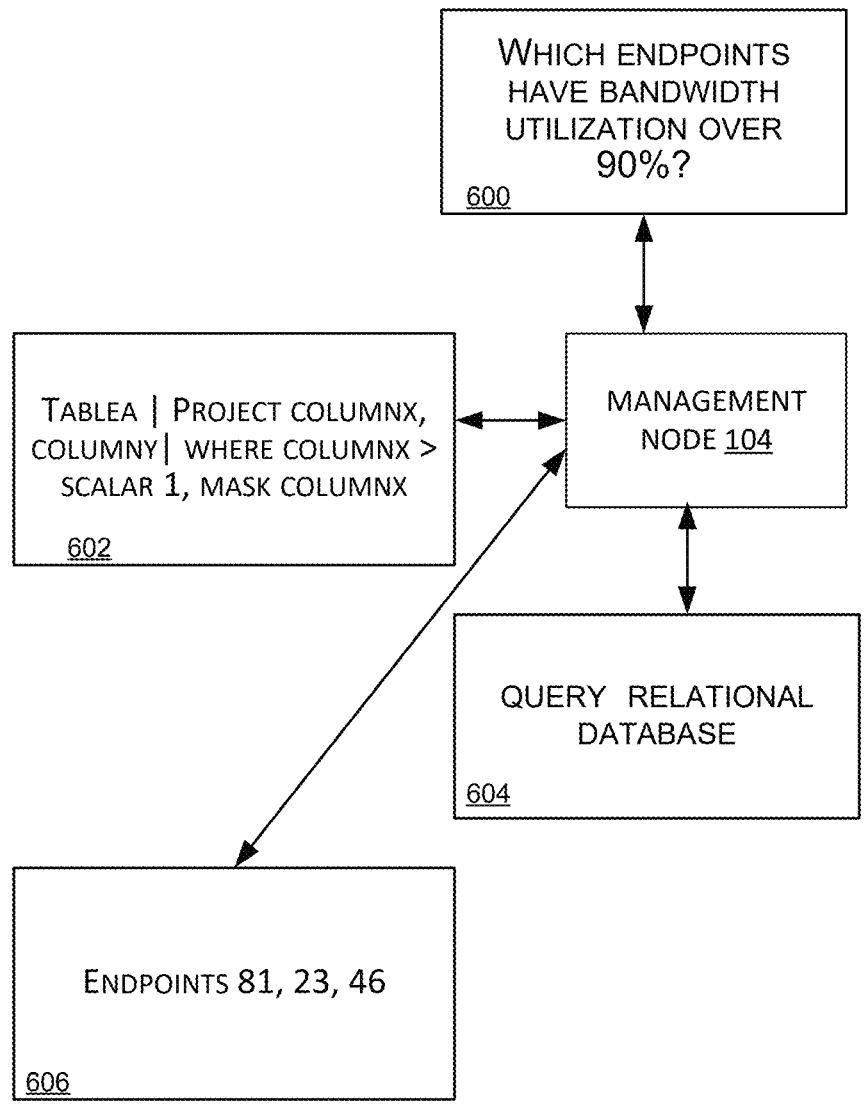
FIG. 6 is a schematic diagram of another user interface operated by a telco operator using a management node such as that of FIG. 1

FIG. 6 is a schematic diagram of the user interface of FIG. 5 for a situation where personally identifiable information is masked by using the process of FIG. 4. In this example the engineer enters natural language query "which endpoints have bandwidth utilization over 90%" 600. The process of FIG. 4 is used to generate candidate query 602 for querying the relational database. The query includes a request for masking column X since column X is determined to contain personally identifiable information (using the metadata repository). The engineer selects the candidate query 602. The engineer is presented with a message indicating that the relational database is being queries 604 with the selected query. The results of the query are then returned and displayed 606 as "Endpoints 81, 23, 46". That is, three endpoints are identified as having bandwidth utilization over 90% and rather than listing their telephone numbers, each telephone number is replaced by a unique token.

In another example, successful pairs of natural language query and relational database query are collected as a result of using the process of FIG. 4 or 5. These are then used as samples to enable prompting of the language model to directly compute the relational database query. Metadata from the metadata repository is included in the prompt. An example of such as prompt is given below and comprises an indication of what table schemas to use and two samples of how to make a translation from natural language to KQL as well as a natural language query to answer.

Example Prompt

Using only the table schemas and samples below and answer the question at the end:

Database Schemas:

[TABLE1](Column1:int, Column2:char255, Column3: DateTime)(Primary Key: Column1, SecondaryKey: Column2)(RowCount:123, ColumnCount:3)(Column2 references foreignkey [TABLE2](Column2))

| Column1 | Column2 | Column3 |
|---------|---------|---------|
| 6 | b | xx.xx.xxx |
| 0 | k | xx.xx.xxx |
| 8 | s | xx.xx.xxx |

[TABLE2](Column1:int, Column2:char255)(Primary Key: Column1, Secondary Key:Column2)(RowCount: 234, ColumnCount:2)(Column2 references foreignkey [TABLE3](Column2))

| Column1 | Column2 |
|---------|---------|
| 1 | a |
| 2 | k |
| 3 | c |

[TABLE3](Column1:int, Column2:char255, Column3: DateTime, Column4:int)(PrimaryKey: Column1, SecondaryKey:Column2)(RowCount:112, ColumnCount: 4)

| Column1 | Column2 | Column3 | Column4 |
|---------|---------|---------|---------|
| 6 | b | xx.xx.xxx | 1 |
| 0 | k | xx.xx.xxx | 3 |
| 8 | s | xx.xx.xxx | 4 |

Figure 7:
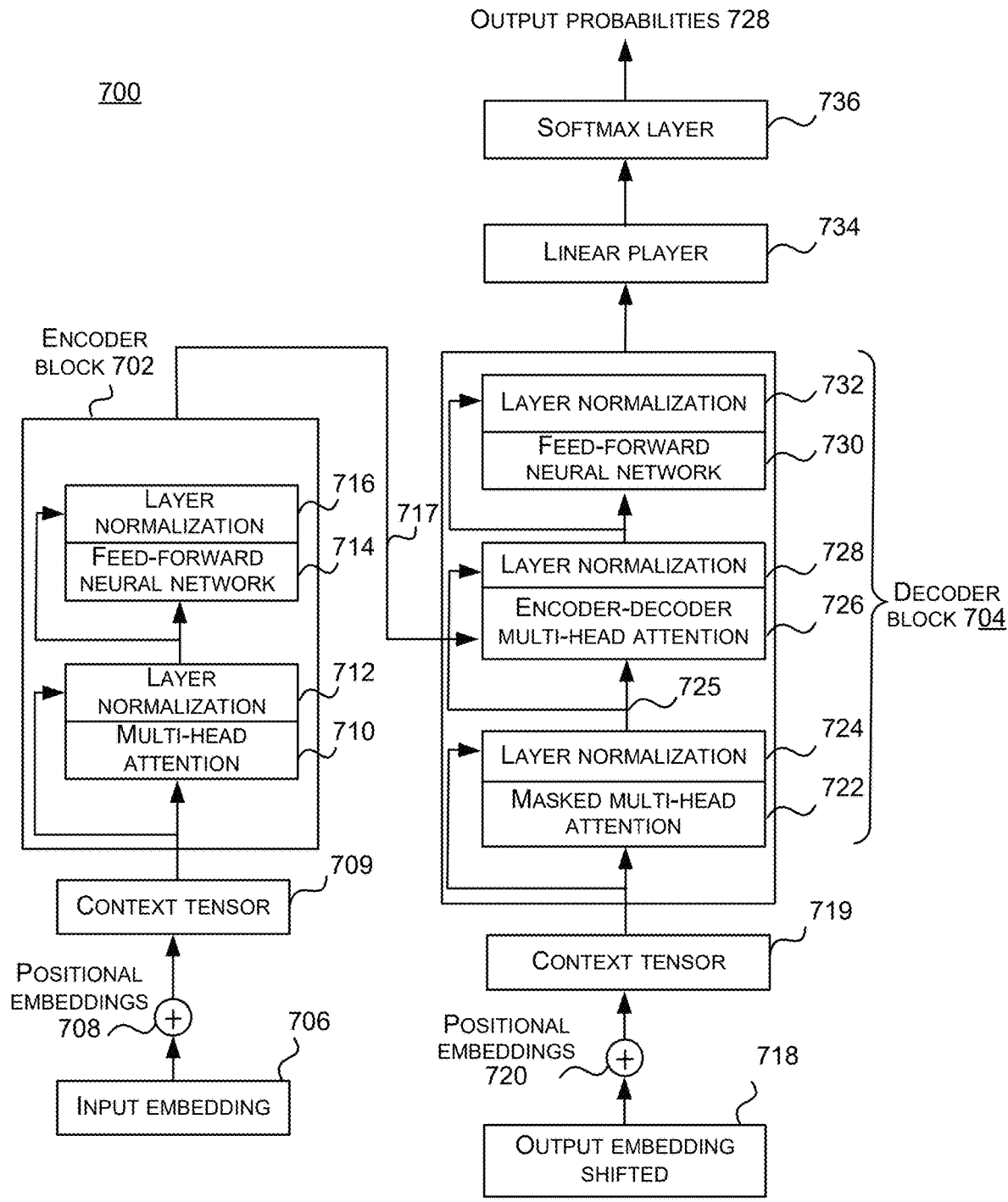
FIG. 7 is a schematic diagram of a language model for use by a management node such as that of FIG. 1.

Samples:
Sample1:
NL: Show me the [X] with condition [Y] and [Z]
KQL:
Table1
|where Column1==3 and Column2=='a'
|project Column3
Sample2:
NL: Show me [X] that are greater than [Y] but have common items of [Z]
KQL:
Table1
|where Column1>5
|join kind-inner unique Column2 on Table2
|project Table1.column1
Question to Answer:
NL: Top 5 teams by q3 scores, pie chart
KQL:

FIG. 7 is a schematic diagram of a language model for use by a management node such as that of FIG. 1. FIG. 7 shows an exemplary architecture of a language model which is a neural network transformer model 700. The example of FIG. 7 is one example of an architecture of a language model and is not intended to be limiting.

The neural network transformer model 700 comprises a plurality of layers of nodes interconnected by edges. There may be as many as several hundred layers of nodes in some examples. The neural network 700 comprises a plurality of transformers implementing self-attention and comprises a plurality of attention heads. Attention heads are used to direct the neural network to focus on a subset of features or tokens in an input sequence thereby learning different representations from the different positions of the tokens in an input sequence. Attention heads and transformers provide the model with a better capability to learn the task at hand thereby generating more accurate predictions of anomalies and/or trends in visual representations of telemetry data.

The neural network transformer model 700 contains one or more encoder blocks 702 coupled to one or more decoder blocks 704. The initial inputs to an encoder block 702 are the input embeddings 706 of an input sequence of a training dataset. In order to retain the order of the tokens in the input embedding 706, positional embeddings 708 are added to the input embedding 706 forming a context tensor 709. The initial inputs to the decoder block 704 are a shifted sequence of the output embeddings 718 from a previous time step to which the positional embeddings 720 are added forming context tensor 719.

An encoder block 702 consists of at least two layers. The first layer includes a multi-head attention component 710 followed by layer normalization component 712. The second layer includes a feed-forward neural network 714 followed by a layer normalization component 716. The context tensor 709 is input into the multi-head attention component 710 of the first encoder block 702 with a residual connection to the layer normalization component 712. The output of the layer normalization component 712 is input to the feed-forward neural network 714 with another residual connection to layer normalization component 716. The output of the encoder block 702 is a set of hidden representations 717. The set of hidden representations 717 is then sent through additional encoder blocks. At the last encoder block, the set of hidden representations 717 is sent to the decoder 704.

Attention is used to decide which parts of the input embedding are important for each token, especially when decoding long sequences since the encoder is limited to encoding a fixed-size vector. Attention mechanisms gather information about the relevant context of a given token and then encode that context into a vector which represents the token. It is used to identity the relationships between tokens in the long sequence while ignoring other tokens that do not have much bearing on a given prediction.

The multi-head attention component 710 takes a context tensor 709 and weighs the relevance of each token represented in the context tensor 709 to each other by generating attention weights for each token in the input embedding 706. In one aspect, the attention function is scaled dot-product attention which is described mathematically as follows:

$$\text{Attention}(Q, K, V) = \text{softmax}\left(\frac{QK^T}{\sqrt{d_k}}\right)V,$$

where the input consists of queries Q and keys K of dimension $d_k$, and values V of dimension $d_v$. Q is a matrix that contains the query or vector representation of one token in a sequence. K is the vector representations of all tokens in the sequence, and V is the vector representations of all the tokens in the sequence.

The queries, keys and values are linearly projected h times in parallel with dr output values which are concatenated to a final value:

$$\text{MultiHead}(Q,K,V)=\text{Concat}(\text{head}_1,\ldots,\text{head}_h)W^O,$$

$$\text{where head}_i=\text{Attention}(QW_i^Q,KW_i^K,VW_i^V).$$

with parameter matrices $W_i^Q \in \mathbb{R}^{d_{model} \times d_k}$, $W_i^K \in \mathbb{R}^{d_{model} \times d_k}$, $W_i^V \in \mathbb{R}^{d_{model} \times d_k}$, and $W^O \in \mathbb{R}^{hd_v \times d_{model}}$.

In order to reduce the training time of the neural network transformer model, layer normalization is used between the layers. The layer normalization components 712, 716 normalize the inputs across the features. In an example, the mean and standard deviation is computed across the feature dimensions.

The feed-forward neural network 714 processes each output encoding separately. The output of the top encoder block is a set of attention vectors K and V 717 which is used by the encoder-decoder multi-head attention layer 726 of the decoder block 704.

The decoder block 704 predicts each token $t_i$ in the output text one-by-one at each time step conditioned on all previously-generated target tokens $t_1, \ldots, t_{i-1}$. A decoder block 704 consists of three layers. The first layer includes a masked multi-head attention component 722 followed by a layer normalization component 724. The output of the layer normalization component 725 is input into the encoder-decoder multi-head attention component 726 with a residual connection to layer normalization component 728. The second layer includes an encoder-decoder multi-head attention component 726 followed by a layer normalization component 728. The third layer includes a feed-forward neural network 730 followed by a layer normalization component 732. The output of layer normalization component 728 is input into the feed-forward neural network 730 with a residual connection to layer normalization component 732.

The masked multi-head attention component 722 receives the output embeddings of the previous timestep. The masked multi-head attention component 722 masks the output embeddings from future time steps. The encoder-decoder multi-head attention layer 722 receives queries from the previous decoder layer and the memory keys and values 717 from the output of the encoder block 702. In this manner, the decoder block 704 can attend to every position of the input sequence. The feed-forward neural network 730 processes each output encoding separately. A layer normalization component 724, 728, 732 is used between the layers in order to normalizes the inputs across the features.

In one example, the neural transformer model contains a stack of six encoder blocks and a stack of six decoder blocks which are aggregated into a neural transformer block. However, other numbers of encoder and decoder blocks may be used. The output of each encoder block is passed onto the next encoder block and processed. Each decoder block receives the attention weights computed from the last encoder block. The use of multiple stacked encoder blocks and decoder blocks increases the model's capacity allowing the model to learn increasing levels of abstraction.

Figure 8:
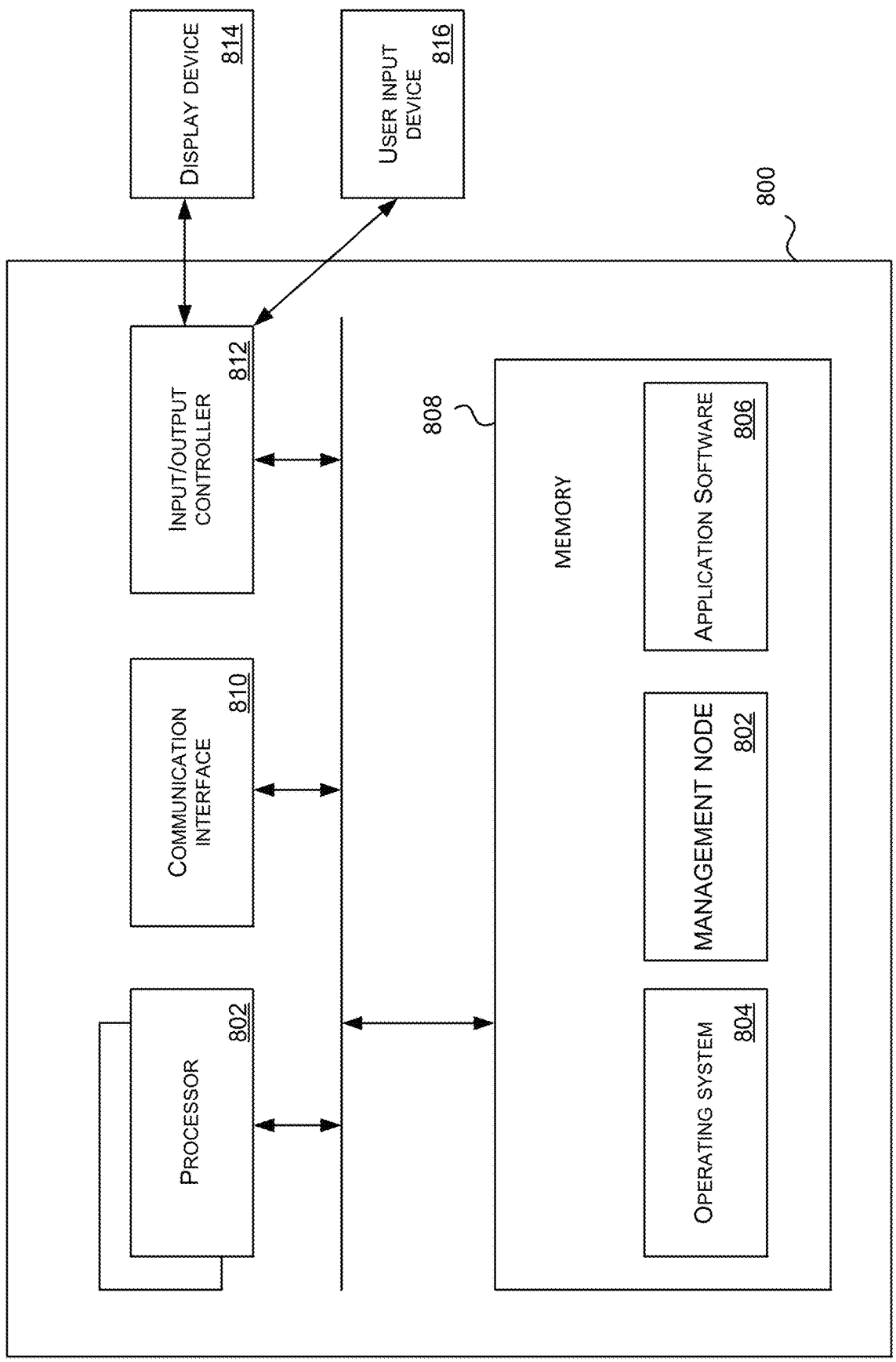
FIG. 8 illustrates an exemplary computing-based device in which embodiments of a management node are implemented.

FIG. 8 illustrates various components of an exemplary computing-based device 800 which are implemented as any form of a computing and/or electronic device, and in which a management node for managing a telecommunications network is implemented in some examples.

Computing-based device 800 comprises one or more processors 802 which are microprocessors, controllers or any other suitable type of processors for processing computer executable instructions to control the operation of the device in order to enable a telco operator to obtain insights from telemetry data using natural language and optionally automatically control a telecommunications network according to the insights. In some examples, for example where a system on a chip architecture is used, the processors 802 include one or more fixed function blocks (also referred to as accelerators) which implement a part of the method of any of FIGS. 2 to 7 in hardware (rather than software or firmware). Platform software comprising an operating system 804 or any other suitable platform software is provided at the computing-based device to enable application software 806 to be executed on the device.

The computer executable instructions are provided using any computer-readable media that is accessible by computing based device 800. Computer-readable media includes, for example, computer storage media such as memory 808 and communications media. Computer storage media, such as memory 808, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 808) is shown within the computing-based device 800 it will be appreciated that the storage is, in some examples, distributed or located remotely and accessed via a network or other communication link (e.g. using communication interface 810). Communications interface enables the computing-based device 800 to receive telemetry data from a telecommunications network and to communicate with a language model and a metadata repository via the internet or the telecommunications network being managed.

The computing-based device 800 also comprises an input/output controller 812 arranged to output display information to a display device 814 which may be separate from or integral to the computing-based device 800. The display information may provide a graphical user interface such as that described with reference to FIGS. 6 and 7. The input/output controller 812 is also arranged to receive and process input from one or more devices, such as a user input device 816 (e.g. a mouse, keyboard, camera, microphone or other sensor). In some examples the user input device 816 detects voice input, user gestures or other user actions and provides a natural user interface (NUI). This user input may be used to select and send configuration files to an orchestrator of the telecommunications network, to trigger actions such as isolating one or more nodes of the telecommunications network or replicating one or more nodes of the communications network. In an embodiment the display device 814 also acts as the user input device 816 if it is a touch sensitive display device.

Alternatively or in addition to the other examples described herein, examples include any combination of the following clauses.

Clause A. A computer-implemented method comprising:
receiving a natural language query from an operator of a telecommunications network; computing a metadata request from the natural language query;
sending the metadata request to a repository of metadata, the metadata describing telemetry data of the telecommunications network, the telemetry data stored in a relational database;
receiving metadata from the metadata repository in response to the metadata request; using the received metadata and a language model to compute a relational database query, for querying the relational database;
querying the relational database using the relational database query;
receiving a response from the relational database and triggering an action using the received response.

Clause B. The method of clause A wherein the repository of metadata is separate from the relational database and wherein the relational database comprises a plurality of tables distributed over different geographical locations.

Clause C. The method of any preceding clause wherein sending the metadata request to a repository of metadata triggers search of an index of tables of the relational database and their column descriptions.

Clause D. The method of any preceding clause wherein the repository of metadata comprises a data map having locations of tables of the relational database and wherein the received metadata comprises a location of a table of the relational database.

Clause E. The method of any preceding clause wherein the received metadata comprises any of: a table name, a column description, a table relationship, an indication that a column contains personally identifiable information, Clause F. The method of any preceding clause wherein computing the metadata request from the natural language query comprises extracting key words from the natural language query and formulating a question from the extracted key words by using any of: a template, rules, a language model.

Clause G. The method of any preceding clause wherein using the received metadata and a language model to compute the relational database query comprises sending a request to the language model to generate an output, wherein the request specifies a relational database query language and contains the received metadata.

Clause H. The method of any preceding clause wherein computing the metadata request comprises computing a request for metadata where personally identifiable information is requested to be masked.

Clause I. The method of clause H wherein receiving the metadata comprises receiving metadata with masking, whereby personally identifiable information is masked such that, the response from the relational database comprises tokens replacing personally identifiable information.

Clause J. The method of any preceding clause comprising prior to querying the relational database, presenting the relational database query as a candidate to a user and receiving user input selecting the candidate.

Clause K. The method of any preceding clause comprising triggering the action by creating a configuration file using rules and the received response from the relational database, and sending the configuration file to an orchestrator of the telecommunications network.

Clause L. An apparatus comprising:
a processor;
a memory storing instructions that, when executed by the processor, perform a method comprising:
receiving a natural language query from an operator of a telecommunications network; computing a metadata request from the natural language query;
sending the metadata request to a repository of metadata, the metadata describing telemetry data of the telecommunications network, the telemetry data stored in a relational database;
receiving metadata from the metadata repository in response to the metadata request; using the received metadata and a language model to compute a relational database query, for querying the relational database;
querying the relational database using the relational database query;
receiving a response from the relational database and triggering an action using the received response.

Clause M. The apparatus of clause L wherein the action is any of:
presenting the response at a user interface, using the response to create a configuration file and sending the configuration file to an orchestrator of the telecommunications network, sending an alert to an operator of the telecommunications network.

Clause N. The apparatus of clause L or M deployed at a management node of a telecommunications network and wherein the repository of metadata is a data governance repository having a data map indicating locations of tables of the relational database distributed geographically.

Clause O. The apparatus of any of clauses L to N comprising an index of tables of the relational database and their column descriptions.

Clause P. The apparatus of any of clauses L to O wherein the repository is updated automatically in response to changes to a schema of the relational database.

Clause Q. A computer-implemented method comprising:
receiving a natural language query from an operator of a 5G telecommunications network; computing a metadata request from the natural language query;
sending the metadata request to a repository of metadata, the metadata describing telemetry data of the 5G telecommunications network, the telemetry data stored in a relational database;
receiving metadata from the metadata repository in response to the metadata request;
using the received metadata and a language model to compute a relational database query, for querying the relational database;
presenting the relational database query to an operator of the 5G telecommunications network;
receiving a user selection, selecting the relational database query;
in response to receiving the user selection, querying the relational database using the relational database query;
receiving a response from the relational database and triggering an action using the received response.

Clause R The method of clause Q wherein computing the metadata request comprises computing a request for metadata where personally identifiable information is requested to be masked.

Clause S The method of clause Q or clause R wherein receiving the metadata comprises receiving metadata with masking, whereby personally identifiable information is masked such that, the response from the relational database comprises tokens replacing personally identifiable information.

Clause T The method of clause S wherein the masking is carried out by the language model.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A computer-implemented method comprising:
receiving a natural language query from an operator of a telecommunications network;
generating a metadata request from the natural language query;
sending the metadata request to a repository of metadata, the metadata describing telemetry data of the telecommunications network, the telemetry data stored in a relational database;
receiving metadata from the metadata repository in response to the metadata request;
using the received metadata, generating a prompt for input to a language model, wherein the prompt is usable to cause the language model to generate a relational database query for querying the relational database using a specified query language;
sending the prompt to the language model;
receiving, in response to the prompt, the relational database query using the specified query language;
querying the relational database using the relational database query; and
receiving a response from the relational database and triggering an action related to the natural language query using the received response; wherein the action is localized in the telecommunications network.

2. The method of claim 1, wherein the repository of metadata is separate from the relational database and wherein the relational database comprises a plurality of tables distributed over different geographical locations.

3. The method of claim 1, wherein sending the metadata request to a repository of metadata triggers search of an index of tables of the relational database and their column descriptions.

4. The method of claim 1, wherein the repository of metadata comprises a data map having locations of tables of the relational database and wherein the received metadata comprises a location of a table of the relational database.

5. The method of claim 1, wherein the received metadata comprises any of: a table name, a column description, a table relationship, an indication that a column contains personally identifiable information.

6. The method of claim 1, wherein computing the metadata request from the natural language query comprises extracting key words from the natural language query and formulating a question from the extracted key words by using any of: a template, rules, a language model.

7. The method of claim 1, wherein using the received metadata comprises sending a request to the language model to generate an output, wherein the request specifies a relational database query language and contains the received metadata.

8. The method of claim 1, wherein computing the metadata request comprises computing a request for metadata where personally identifiable information is requested to be masked.

9. The method of claim 8, wherein receiving the metadata comprises receiving metadata with masking, whereby personally identifiable information is masked such that, the response from the relational database comprises tokens replacing personally identifiable information.

10. The method of claim 1, further comprising prior to querying the relational database, presenting the relational database query as a candidate to a user and receiving user input selecting the candidate.

11. The method of claim 1, further comprising triggering the action by creating a configuration file using rules and the received response from the relational database, and sending the configuration file to an orchestrator of the telecommunications network.

12. An apparatus comprising:
a processor;
a memory storing instructions that, when executed by the processor, perform operations comprising:
receiving a natural language query from an operator of a telecommunications network;
computing a metadata request from the natural language query;
sending the metadata request to a repository of metadata, the metadata describing telemetry data of the telecommunications network, the telemetry data stored in a relational database;
receiving metadata from the metadata repository in response to the metadata request;
using the received metadata, generating a prompt for input to a language model, wherein the prompt is usable to cause the language model to generate a relational database query for querying the relational database using a specified query language;
sending the prompt to the language model;
receiving, in response to the prompt, the relational database query using the specified query language;
querying the relational database using the relational database query; and
receiving a response from the relational database and triggering an action related to the natural language query using the received response.

13. The apparatus of claim 12, wherein the action is any of: presenting the response at a user interface, using the response to create a configuration file and sending the configuration file to an orchestrator of the telecommunications network, sending an alert to an operator of the telecommunications network.

14. The apparatus of claim 12, wherein the apparatus is communicatively coupled to a management node of a telecommunications network and wherein the repository of metadata is a data governance repository having a data map indicating locations of tables of the relational database distributed geographically.

15. The apparatus of claim 12, further comprising an index of tables of the relational database and their column descriptions.

16. The apparatus of claim 12, wherein the repository is updated automatically in response to changes to a schema of the relational database.

17. A computer-implemented method comprising:
receiving a natural language query from an operator of a 5G telecommunications network;
computing a metadata request from the natural language query;
sending the metadata request to a repository of metadata, the metadata describing telemetry data of the 5G telecommunications network, the telemetry data stored in a relational database;
receiving metadata from the metadata repository in response to the metadata request;
using the received metadata, generating a prompt for input to a language model, wherein the prompt is usable to cause the language model to generate a relational database query for querying the relational database using a specified query language;
sending the prompt to the language model;
receiving, in response to the prompt, the relational database query using the specified query language;
presenting the relational database query to an operator of the 5G telecommunications network;
receiving a user selection, selecting the relational database query;
in response to receiving the user selection, querying the relational database using the relational database query; and
receiving a response from the relational database and triggering an action related to the natural language query using the received response.

18. The method of claim 17, wherein computing the metadata request comprises computing a request for metadata where personally identifiable information is requested to be masked.

19. The method of claim 18, wherein receiving the metadata comprises receiving metadata with masking, whereby personally identifiable information is masked such that, the response from the relational database comprises tokens replacing personally identifiable information.

20. The method of claim 19, wherein the masking is carried out by the language model.

* * * * *